Figure 1:
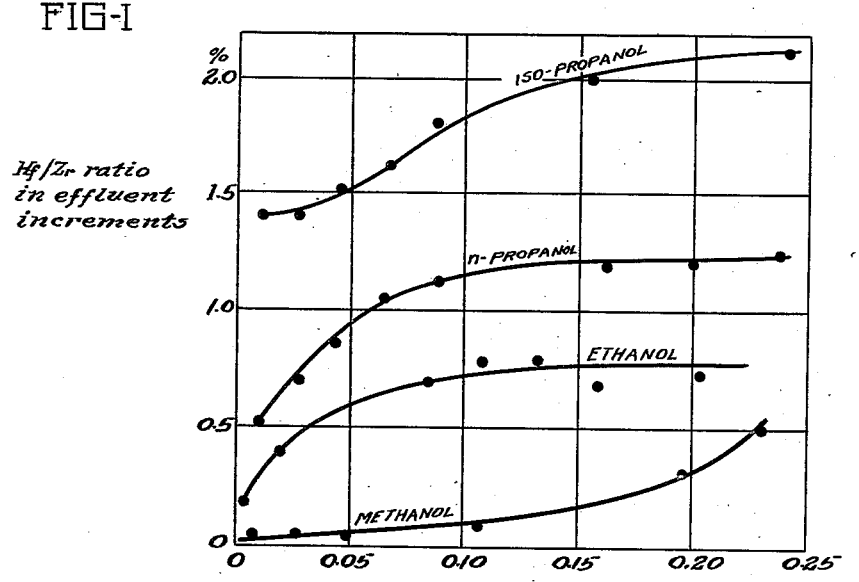

Oct. 16, 1951 R. S. HANSEN 2,571,237
ADSORPTION SEPARATION OF ZIRCONIUM AND HAFNIUM
Filed Oct. 4, 1950 2 Sheets-Sheet 1

Effect of solvents upon Zr-Hf separation feed
Conditions: 600 gm. ZrCl₄ in 300 ml. solvent-2.35% Hf/Zr
Columns: 50 mm. x 1.2 m. length-1000 gm. silica gel Comparison of column size in Zr-Hf separation
Curve 1 - 50 mm. dia x 1.2 m. length - 0.95 kg. silica gel
Curve 2 - 100 mm. dia x 1.5 m. length - 9.5 kg. silica gel INVENTOR.
BY Robert S. Hansen.
Roland A. Anderson
Attorney.

Adsorption isotherm for batch adsorption at 20°C. 50 ml. ZrCl₄-CH₃OH solution, 2.5 grams silica gel.

Differential stripping of Zr and Hf from silica gel with 2.5 molar HCl in methanol—55 kg. gel Patented Oct. 16, 1951

2,571,237

UNITED STATES PATENT OFFICE 2,571,237

ADSORPTION SEPARATION OF ZIRCONIUM AND HAFNIUM

Robert S. Hansen, Ames, Iowa, assignor to the United States of America as represented by the United States Atomic Energy Commission Application October 4, 1950, Serial No. 188,443

11 Claims. (Cl. 23—19)

The present invention is concerned with a method for the separation of zirconium and hafnium.

It has been found that the metals, zirconium and hafnium, have properties which make them very desirable for certain industrial and engineering uses. The corrosion resistance of zirconium to acids is very good and its resistance to alkali corrosion is outstanding. The corrosion resistance of zirconium at elevated temperatures makes it one of the most satisfactory metals for high temperature applications. The corrosion resistance of zirconium is apparently affected by its purity and it is therefore important that highly purified zirconium be obtained. Hafnium is now believed to be one of the most satisfactory metals for use in refractories because of its high melting point and resistance to corrosion at elevated temperatures. Hafnium and zirconium are always found in nature intermingled except in the comparatively rare zirconium ore, polymignite. The amount of hafnium occurring with zirconium is not large; the hafnium-to-zirconium weight ratio varies from about 0.7 to 5% and is about 2.3% in the most common American ore. The two metals, however, are so very similar in their chemical properties that it has been extremely difficult to separate the hafnium from the zirconium. In fact, it was more than a century after the discovery of zirconium that hafnium was discovered because of this very close similarity of chemical properties. Several methods of separating these elements have been devised but these methods in general are unsatisfactory for large scale production either because of the poor separations obtained, the inherent high costs of the methods, or the difficulty of converting the end-product of the purification steps to the metal.

An object of the present invention is to provide a method of separating hafnium and zirconium which will be simple and inexpensive and yet result in a high degree of purification of the zirconium.

An addition object of the present invention is to provide a method for concentrating hafnium values.

Still other objects of the present invention will be apparent from the description which follows.

I have discovered that silica gel will adsorb hafnium preferentially from an organic solution of the mixed zirconium-hafnium tetrachlorides and that highly purified zirconium may be obtained in an organic solution by contacting a solution of the mixed zirconium-hafnium tetrachlorides with a silica gel adsorbent whereby the hafnium values are preferentially adsorbed thereon and then separating the organic solvent containing the purified zirconium values from the adsorbent. The hafnium can then be recovered from the silica gel adsorbent in concentrated form by treatment of the adsorbent with an organic solvent or an acidic solution. The enriched hafnium solution thus obtained is suitable for further conventional treatment to produce the pure hafnium.

Although the process of the present invention may be employed as a batch method for the recovery of pure zirconium values, the process may also be used as a column method. The silica gel used in the column is preferably one which has been activated. The activation may be effected by heating the silica gel at a temperature of approximately 300° C. for at least thirty minutes and preferably about two hours. The fineness of the silica gel is not critical in the present process and silica gel of any mesh suitable for column operation may be employed; for example, very satisfactory results have been obtained by the use of 28–200 mesh silica gel. It is desirable that the silica gel be as free from nonvolatile impurities as possible.

The column feed solution is prepared by dissolving the mixed zirconium-hafnium tetrachloride in an organic solution. The organic solvent may be an alcohol, a ketone, an aldehyde, an organic acid or other similar solvent in which the tetrachloride will dissolve without decomposition of the tetrachloride or of the solvent. Representative solvents include methanol, glycerol, benzyl alcohol, acetone, acetaldehyde, acetic acid and nitrobenzene. Oxygen-containing organic solvents have been found to be preferable. The alcohols have been found to be most suitable in that they have less tendency to decompose than some of the other solvents, such as acetone, and they permit highly preferential separation. Both the monohydric and polyhydric alcohols may be used, but it is believed that the monohydric alcohol, methanol, is the most satisfactory solvent. A comparison of the separations achieved with methanol, isopropanol, n-propanol and ethanol is shown in Figure 1. Zirconium tetrachloride is soluble in methanol at least to the extent of 1 mg./ml. but at the higher concentrations the solution is extremely viscous. Zirconium tetrachloride-methanol solutions between about 10 and 40% are suitable for use in column operation but a 15–25% zirconium tetrachloride-methanol solution is preferable.

The adsorption of the hafnium and zirconium on the silica gel is not instantaneous. The hafnium is adsorbed more rapidly than the zirconium and it subsequently exchanges with adsorbed zirconium over a considerable period. Furthermore, when the concentrations of hafnium and zirconium are both increased in proportion in solution, the relative increase in the amount of hafnium adsorbed is greater considerably than the relative increase of zirconium adsorbed. It is therefore desirable that relatively slow flow rates be employed during the adsorption cycle. However, for a column packed with 28–200 mesh silica gel, a flow rate of 20 cm./hr. based on the empty column is satisfactory and flow rates slower than this do not produce an appreciable improvement in results. The above flow rates can, of course, be most easily achieved by flowing the influent from the bottom to the top of the column.

Figure 2:
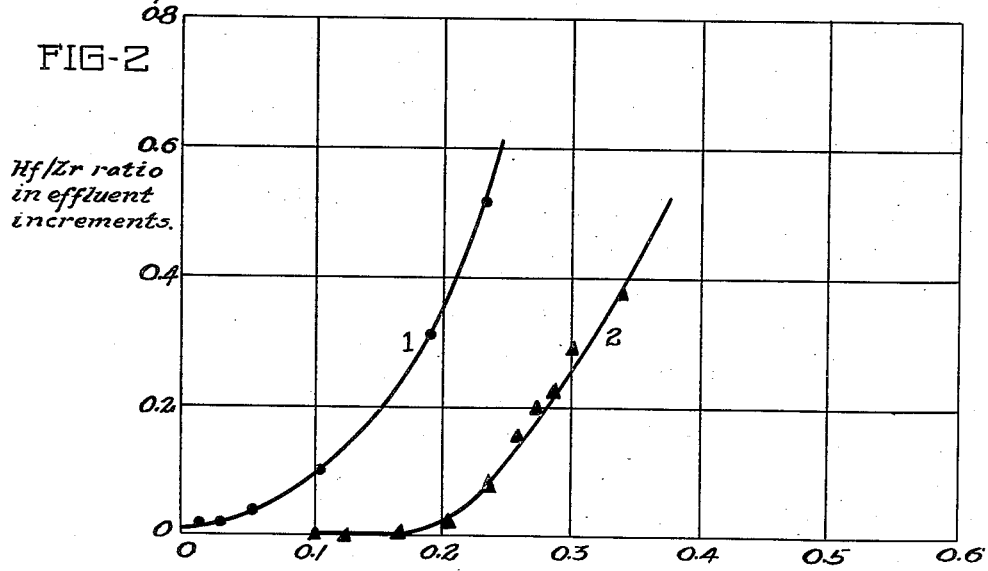
Figure 3:
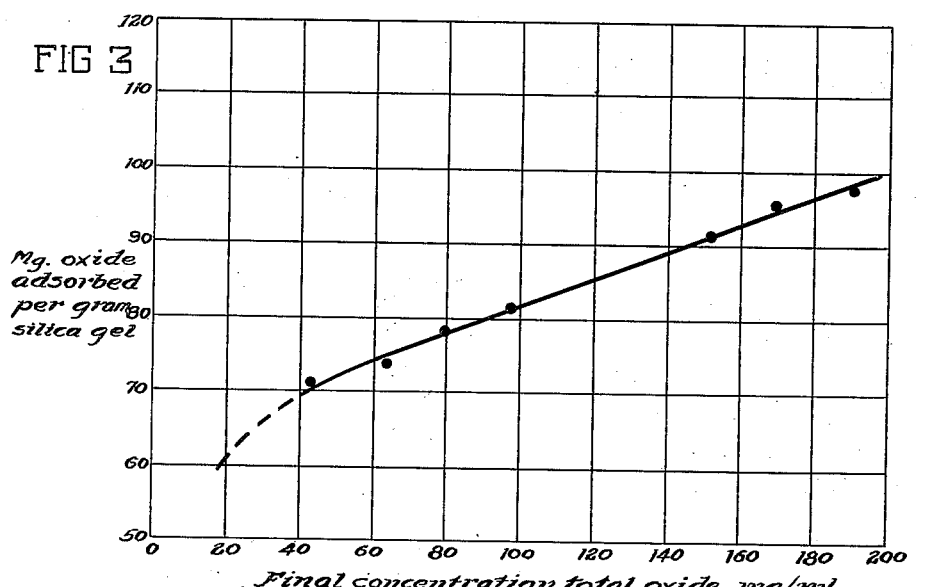

Although quite satisfactory separation may be effected with very small columns containing amounts of silica gel of, for example, .95 kg., appreciably better results can be obtained with larger columns, for example a column containing 9.5 kg. of silica gel. The difference in results is shown graphically in Figure 2. The results obtained with 9.5 kg. of silica gel shown in curve 2 are in good agreement with results obtained with a column 100 mm. in diameter containing 5.4 kg. of silica gel and with a column 160 mm. in diameter containing 18 kg. of silica gel. It therefore appears that curve 2 represents the performance expected in an intermediate or large scale operation. The capacity of the silica gel for the adsorption of hafnium is limited as is shown by the adsorption isotherm, Figure 3, and the amount of influent solution introduced into any column should therefore be limited. This limit depends upon several factors particularly the separation factor desired, but also on the hafnium-zirconium ratio of feed material and the total quantity of silica gel. Comparisons of these factors can be made by reference to the curves shown in Figure 2. Where the hafnium-zirconium ratio of feed material is 0.02 and a product spectroscopically free of hafnium is desired, the feed equivalent of tetrachloride is preferably not greater than 1 kg. of $ZrO_2$ per 5 kg. of silica gel; after this quantity of feed solution has entered the column, pure methanol can be used as a flushing agent. Of course, if less pure zirconium is desired, larger quantities of influent solution may be used per unit of silica gel.

Figure 4:
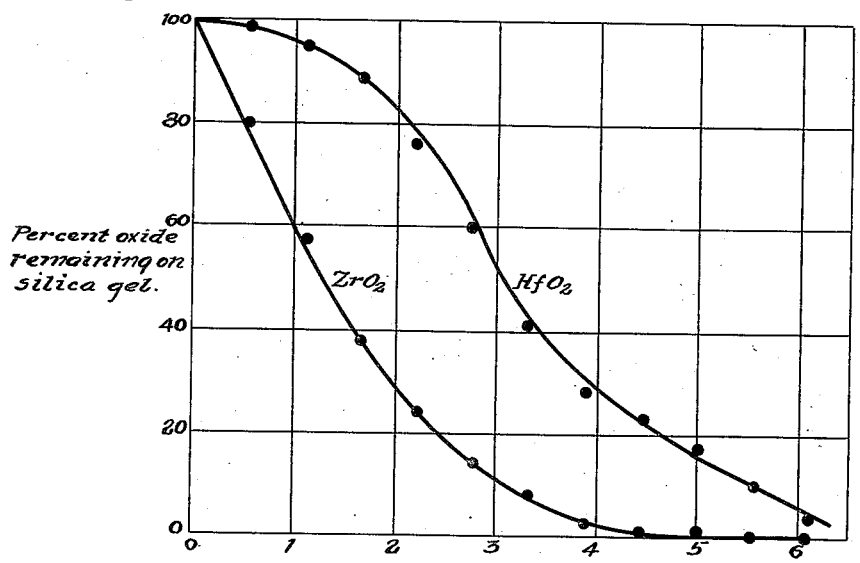

The adsorbed hafnium may be recovered in highly concentrated solution by differential stripping of the silica gel. In column operation, the silica gel will normally contain approximately 0.1 g. of total hafnium-zirconium oxide equivalent per gram of silica gel. Approximately 10% of the total adsorbed oxide equivalent is hafnium oxide. By passing an acidic organic solution such as 2.5 M anhydrous hydrochloric acid in methanol through the column, the zirconium is preferentially removed in the first increments and the subsequent increments will be very much enriched in hafnium values. By this method nearly 90% of the adsorbed hafnium can be removed as a 20% hafnium oxide-80% zirconium oxide product, 60% as a 30% hafnium oxide product or about 20% as a 60% hafnium oxide product. Even greater concentration may also be achieved but at the expense of yield. Figure 4 illustrates the differential stripping of hafnium and zirconium from the adsorbent.

An alternative method comprises passing a neutral organic solvent such as methanol through the column whereby about one-half of the adsorbed zirconium but very little hafnium is removed and then passing an acidic solution through the column whereby the hafnium is recovered. Final stripping of the silica gel is best achieved by use of an aqueous 7 N $H_2SO_4$ solution. Such stripping requires less than one-half the volume required for 2.5 M hydrochloric acid in methanol but is not differential. The stripping with 7 N $H_2SO_4$ will effectively remove all of the zirconium-hafnium oxide adsorbed thereon and the silica gel can then be reactivated and used again in the process. An example of the operation of the process follows.

*Example*

A 181-g. mixture of zirconium-hafnium tetrachloride, the hafnium content being 2.3%, was dissolved in .906 liter of methanol. A granular (28–200 mesh) silica gel in the amount of .95 kg. which had been activated by heating for two hours at 300° C. was sludged with methanol and the sludge poured into a column 50 mm. in diameter and 1.2 m. in length thereby forming a bed of the silica gel in the column. The zirconium-hafnium tetrachloride methanol solution was then passed through the column as an upflow influent at a flow rate of 20 cm. of solution per hour and the effluent containing the purified zirconium collected. The column was then flushed with 250 cc. of pure methanol. A 2.5 M hydrochloric acid-methanol solution was then passed through the column as an upflow influent and the effluent collected in increments of 1 liter each. The increments containing less than 30% hafnium with respect to zirconium were treated to recover the mixed hafnium-zirconium tetrachloride for recycling with subsequent batches and the increments containing greater than 30% hafnium were set aside for further processing and purification by other methods to recover pure hafnium.

While there have been described certain embodiments of my invention, it is to be understood that it is capable of many modifications. Changes, therefore, may be made without departing from the spirit and scope of the invention as described in the appended claims, in which it is the intention to claim all novelty in the invention as broadly as possible.

What is claimed is:

1. The process of separating hafnium from zirconium, which comprises contacting a silica gel adsorbent with an organic solution of zirconium and hafnium tetrachlorides whereby hafnium values are preferentially adsorbed on the silica gel.

2. The process of separating hafnium from zirconium, which comprises passing an organic solution of hafnium and zirconium tetrachlorides through a silica gel adsorbent bed whereby the hafnium values are preferentially adsorbed on said silica gel, collecting the zirconium-containing effluent, then passing an acidic solution through the colmun whereby the hafnium values are desorbed therefrom, and collecting the hafnium-enriched solution.

3. The process of separating hafnium from zirconium, which comprises passing an organic solvent containing dissolved hafnium and zirconium tetrachlorides through a silica gel adsorbent column whereby the hafnium values are adsorbed thereon, and collecting the zirconium-containing effluent.

4. The process of claim 3 wherein the organic solvent is an alcohol.

5. The process of claim 3 wherein the organic solvent is methanol.

6. The process of claim 3 wherein the organic solvent is ethanol.

7. The process of separating hafnium values from zirconium values, which comprises passing a 10-40% solution of hafnium-zirconium tetrachloride in methanol through a column containing activated granular silica gel whereby the hafnium is adsorbed thereon, and collecting the zirconium-containing effluent.

8. The process of claim 7 wherein the influent solution is 15-25% hafnium-zirconium tetrachloride in methanol.

9. The process of separating hafnium from zirconium, which comprises passing a methanol solution containing 15-25% hafnium-zirconium tetrachloride through a column containing activated granular silica gel at a flow rate not greater than 20 cm./hr., and collecting the zirconium-containing effluent.

10. The process of preferentially desorbing hafnium values from a silica gel adsorbent containing adsorbed zirconium and hafnium values, which comprises passing a 2.5 M anhydrous hydrochloric acid in methanol eluant over said adsorbent, and collecting the effluent solution in successive portions.

11. The process of desorbing hafnium values from a silica gel adsorbent containing adsorbed hafnium and zirconium values, which comprises passing a 7 N $H_2SO_4$ solution over said adsorbent.

ROBERT S. HANSEN.

No references cited.